United States Patent
Nilsen et al.

(10) Patent No.: US 6,699,308 B1
(45) Date of Patent: Mar. 2, 2004

(54) METHOD AND APPARATUS FOR THE DRYING OF NATURAL GAS

(75) Inventors: Finn Patrick Nilsen, Nattland (NO); Harald Linga, Nesttun (NO)

(73) Assignee: Statoil ASA, Stavanger (NO)

( * ) Notice: Subject to any disclaimer, the term of this patent is extended or adjusted under 35 U.S.C. 154(b) by 0 days.

(21) Appl. No.: 09/937,241

(22) PCT Filed: Mar. 21, 2000

(86) PCT No.: PCT/GB00/01070

§ 371 (c)(1),
(2), (4) Date: Jan. 22, 2002

(87) PCT Pub. No.: WO00/56844

PCT Pub. Date: Sep. 28, 2000

(30) Foreign Application Priority Data

Mar. 23, 1999 (GB) ................................. 9906717

(51) Int. Cl.$^7$ ........................... B01D 53/14; B01D 47/10
(52) U.S. Cl. .............. 95/216; 95/174; 95/231; 96/234; 96/323; 261/DIG. 54
(58) Field of Search ............... 95/216, 231, 172, 95/173, 174; 96/323, 275, 312, 234; 261/DIG. 54

(56) References Cited

U.S. PATENT DOCUMENTS

| 2,887,390 | A | * | 5/1959 | Coulter et al. |
| 3,593,497 | A | * | 7/1971 | Grimm et al. |
| 4,023,938 | A | * | 5/1977 | Guth et al. |
| 4,279,628 | A | | 7/1981 | Wymer |
| 5,035,842 | A | * | 7/1991 | Mohn |
| 5,135,684 | A | * | 8/1992 | Mohn et al. |
| 6,280,505 | B1 | * | 8/2001 | Torkildsen et al. |
| 6,284,023 | B1 | * | 9/2001 | Torkildsen et al. |
| 6,284,024 | B1 | * | 9/2001 | Torkildsen et al. |

FOREIGN PATENT DOCUMENTS

| EP | 0379319 | * | 7/1990 |
| GB | 2301048 | | 5/1995 |
| WO | 95/02448 | * | 1/1995 |

OTHER PUBLICATIONS

Search Report—PCT/GB00/01070.
Preliminary Examination Report—PCT/GB00/01070.

* cited by examiner

Primary Examiner—Duane S. Smith
(74) Attorney, Agent, or Firm—Patterson, Thuente, Skaar & Christensen, P.A.

(57) ABSTRACT

A system for removing water from natural gas which comprises: bringing the natural gas into contact with a liquid including an absorbent for the water; subjecting the natural gas and liquid to turbulent mixing conditions thereby causing the water to be absorbed by the absorbent; and separating a natural gas phase with reduced water content and a liquid phase including the absorbent and absorbed water. The mixing is conducted in a turbulent contactor (11) including a gas inlet (15), a liquid inlet (16), an outlet (104) leading to a venturi passage (105) and a tube (106) extending from the outlet (104) back upstream. The tube (106) may be perforated and/or spaced from the periphery of the outlet (104).

32 Claims, 3 Drawing Sheets

METHOD AND APPARATUS FOR THE DRYING OF NATURAL GAS

TECHNICAL FIELD

The present invention is concerned with a method and apparatus for the removal of water from natural gas.

BACKGROUND OF THE INVENTION

Natural gas as extracted from reservoirs contains water vapour. The concentration of the water vapour depends on the temperature and pressure of the gas at the extraction point. During the processing of the gas, particularly if it is treated to remove acid gas components such as carbon dioxide, $CO_2$, and hydrogen sulphide, $H_2S$, it may come into contact with aqueous solvents. This means that the gas may pick up further water vapour. When the gas is contacted with an aqueous solvent, it will become saturated with water vapour at the prevailing temperature and pressure. Before the gas is exported from the production facility the water vapour concentration in the gas must be reduced to very low levels. A typical specification may be 0.2 parts per million by volume (ppm v/v) of water in the gas. This is well below the concentrations which will normally be in the gas as extracted and well below the value after processing to remove $CO_2$ and/or $H_2S$. The gas, therefore has to be dried before it can be compressed for export Currently, the processes are generally used to dry a gas. These are based on absorption or adsorption respectively. In the adsorption, the gas is contacted with a porous solid material. The water vapour adsorbs onto the surface of the solid. The adsorbent is usually a silicious material, typically a mixture of aluminium and silica oxides known as molecular sieves. In absorption the gas is contacted with a chemical reagent which removes the water. The present application is concerned with absorption drying-dehydration processes.

In conventional drying processes alcohols, usually the glycols, monoethylene glycol, MEG, or triethylene glycol, TEG, are contacted with gas in a countercurrent tower. The gas is normally saturated with water vapour at the inlet conditions, temperature and pressure. The saturation concentration increases with increasing temperature and decreasing pressure. In a typical set of conditions, 80° C. and 70B ($7 \times 10^6$ Pa) pressure, the saturation concentration is $8 \times 10^{-3}$ kg/mmscm of gas. The concentration of water in the outlet gas will vary slightly with conditions on pipe line specifications but is typically of the order of $6.4 \times 10^{-5}$ kg/mmscm of gas. This corresponds to a water low point at 70 Bg of −7° C., well below the hydrate formation point.

In order to assess the absorption duty between these low concentrations, the thermodynamic equilibrium data—concentration of water in the gas, y*, and concentration of water in the liquid phase, x- is required. Note:

$$y^*_p = f(x)_p \tag{1}$$

i.e., the function $f$ is dependent on the pressure.
The relevant data shows that the separation can be achieved in one theoretical stage, i.e. if equilibrium were achieved in the contacting (mixing) process, then one contact between the gas and liquid should give the required duty of water removal from the gas.

However, in conventional countercurrent tower units, 4 actual stages are normally specified. Stage efficiencies greater than 50% are simply not achieved.

SUMMARY OF THE INVENTION

It is therefore an object of the invention to provide a method and apparatus which enables water vapour to be removed from a natural gas with greater efficiency.

According to the invention, there is provided a method of removing water from natural gas which comprises: bringing the natural gas into contact with a liquid including an absorbent for the water; subjecting the natural gas and liquid to turbulent mixing conditions thereby causing the water to be absorbed by the absorbent; and separating a natural gas phase with reduced water content and a liquid phase including the absorbent and absorbed water; and in which the mixing is conducted in a turbulent contactor including a gas inlet, a liquid inlet, an outlet leading to a venturi passage and a tube extending from the outlet back upstream, the tube being perforated and/or being spaced from the periphery of the outlet.

While the invention has been described in relation to natural gas, it is equally applicable to other gases with a water content which it is desirable to reduce.

The invention also extends to the apparatus for carrying out this method.

The turbulent mixing is very intense and results in extremely efficient gas liquid contact. The mixing regime is preferably turbulent shear layer mixing. The liquid entrained in the gas may be in the form of droplets for gas continuous fluid phase distribution. The efficient mixing means that absorption can take place very rapidly and in a relatively small total volume of absorbent compared to that required in conventional absorption columns. The mixing system used is simple and inexpensive compared to prior art systems, leading to reduced costs. Finally, an efficiency of approaching 100% for the removal of water can be achieved for certain applications.

The advantages of such a mixer in relation to conventional countercurrent dehydration towers are a reduction in the size and weight of the equipment.

Preferably, the method is carried out as a continuous process with the natural gas and liquid flowing co-currently. The co-current flow reduces the problems associated with foaming and flooding, since absorption can continue downstream of the contactor.

One suitable contactor is a mixer supplied by Framo Engineering A/S and is described in EP-B-379319.

Preferably, the tube is located in a vessel, the vessel including the gas inlet, the liquid inlet and the outlet. In one possible regime, the natural gas is supplied to the tube, optionally directly, and the liquid is supplied to the vessel, and so the natural gas stream draws the liquid into the venturi and the two phases are mixed. In another regime, the natural as is supplied to the vessel and the liquid is supplied to the tube, optionally directly, whereby the natural gas is drawn into the venturi by the liquid and the two phases are mixed. In a third regime, the liquid and the natural gas are supplied to the vessel, the liquid being supplied to a level above the level of the outlet, whereby the natural gas is forced out through the outlet via the tube, thereby drawing the liquid into the venturi so that the two phases are mixed.

Preferably, the natural gas and the liquid are formed into a homogeneous mixture in the contactor, the homogeneous mixtures optionally being cooled prior to separation into a gas phase and a liquid phase. Preferably, the homogeneous mixture is separated into a gas phase and a liquid phase in a hydrocyclone. Preferably, the absorbent in the liquid phase is subjected to a regeneration treatment to remove the absorbed water. Preferably, the regenerated absorbent-coating liquid phase is recycled to the contactor. Preferably, the regeneration is carried out by heating and/or by flashing off the water. Where the absorbent is a glycol, regeneration may be carried out by heating the solution to about 200° C.

and passing the vapours to a fractionating tower. Preferably, the post-mixing cooling and the regenerative heating are achieved, at least in part by mutual heat exchange.

Partial recovery of the glycol may be attained by flashing off the water vapour by reducing the applied pressure on the liquid after gas dehydration. Where this is used then a similar turbulent mixer may be considered for this duty. This flashing operation will only give a partial glycol regeneration. In order to get to the very low levels of water content of the glycol solutions necessary for gas dehydration, heating of the solvent phase is required.

According to a more specific aspect of the invention, there is provided a method for removing water from a natural gas which comprises: supplying the natural gas to a turbulent contactor; supplying a liquid including an absorbent for the water to the contactor; subjecting the natural gas and the liquid to turbulent mixing in the contactor to form a homogeneous mixture; allowing the water to be absorbed by the absorbent; separating the homogeneous mixture into a gas phase and a liquid phase in a hydrocyclone (or any other gas/liquid separator); removing the gas phase; subjecting the solvent in the liquid phase to a regeneration treatment to remove the absorbed water, and recycling the regenerated absorbent-containing liquid phase to the contactor.

A portion of the solvent, after extraction may be recycled directed to the contactor.

Preferably, the absorbent includes a glycol or another water-miscible liquid. Preferably, the glycol is ethylene glycol, diethylene glycol, triethylene glycol or a mixture of any of these. The chosen absorbent could also be immiscible with water and in this case, a facility for separating the water from the absorbent would need to be introduced down of the gas/liquid separator.

Diethylene glycol (DEG) and monoethylene glycol (MEG) are typical solvents for dehydration. Triethylene glycol (TEG) is currently the most popular solvent since it has a higher degradation temperature and can be regenerated to a higher lean concentration with no modification to a standard boiler. There has recently been a trend towards the reduction in BTEX (benzene, toluene, ethylbenzene, xylene) emissions which has in some cases favoured the use of MEG due to the much lower solubility of BTEX in this solvent. The penalty, however, is much higher glycol losses. The present invention envisages the use of any dehydration agent. However, the short residence time in the preferred contactor system (as compared with a counter-current absorption column) will necessarily result in less co-absorption of BTEX components in a given glycol system.

Preferably the natural gas and liquid are subjected to two or more mixing steps. Additional mixing steps may be carried out before and/or after the turbulent mixing step. One or more (or indeed all) of the additional mixing steps may themselves be turbulent mixing steps. They might be carried out using a similar turbulent contactor, or some other turbulent contactor, such as an ejector, a jet pump, or a mixer as described in WO 95/02448. Preferably, there are two or more turbulent mixing steps.

When second turbulent mixing is adopted, it is preferably conducted in a turbulent contactor comprising at least one fluid inlet, an outlet leading to a venturi passage, and a tube extending from the outlet back into the contractor. Preferably, the second contactor has a gas inlet and a liquid inlet. The tube may or may not be perforated, and the gap between the tube and the outlet may be varied. Preferably, the second turbulent contactor is located in a pipe extending from the venturi section of the first contactor. The second turbulent contactor may also have a separate liquid inlet for the addition of fresh absorbent.

The invention also extends to apparatus for carrying out such a method, comprising a turbulent contactor having a liquid inlet, a gas inlet and a fluid outlet; an optional cooler for the fluid stream from the fluid outlet; a hydrocyclone arranged to separate the fluid stream into a gas phase and a liquid stream; a regenerator arranged to treat the separated liquid stream; and a recycle line arranged to convey the regenerated liquid stream to the contactor.

The apparatus may include a recycle line for the liquid stream from the separator to the contactor, by-passing the regenerator. There may also be a further separator, for example, in the from of a flash tank, in the recycle line to allow absorbed water to be released from the liquid.

The apparatus may include a pump arranged to supply liquid to the liquid inlet of the contactor. Preferably, the regenerator is a heater and/or a flash tank.

The invention may be considered to extend to the use of a turbulent contractor to remove water from natural gas by forming a homogeneous mixture of the gas mixture with an absorbent for the water in the contactor, allowing the water to be absorbed by the absorbent, and subsequently separating a gas phase and a liquid phase, the liquid phase thereby containing the water.

BRIEF DESCRIPTION OF THE DRAWINGS

The invention may be put into practice in various ways and some embodiments will be described by way of example to illustrate the invention with reference to the accompanying drawings, in which.

DETAILED DESCRIPTION OF THE DRAWINGS

Figure 1:
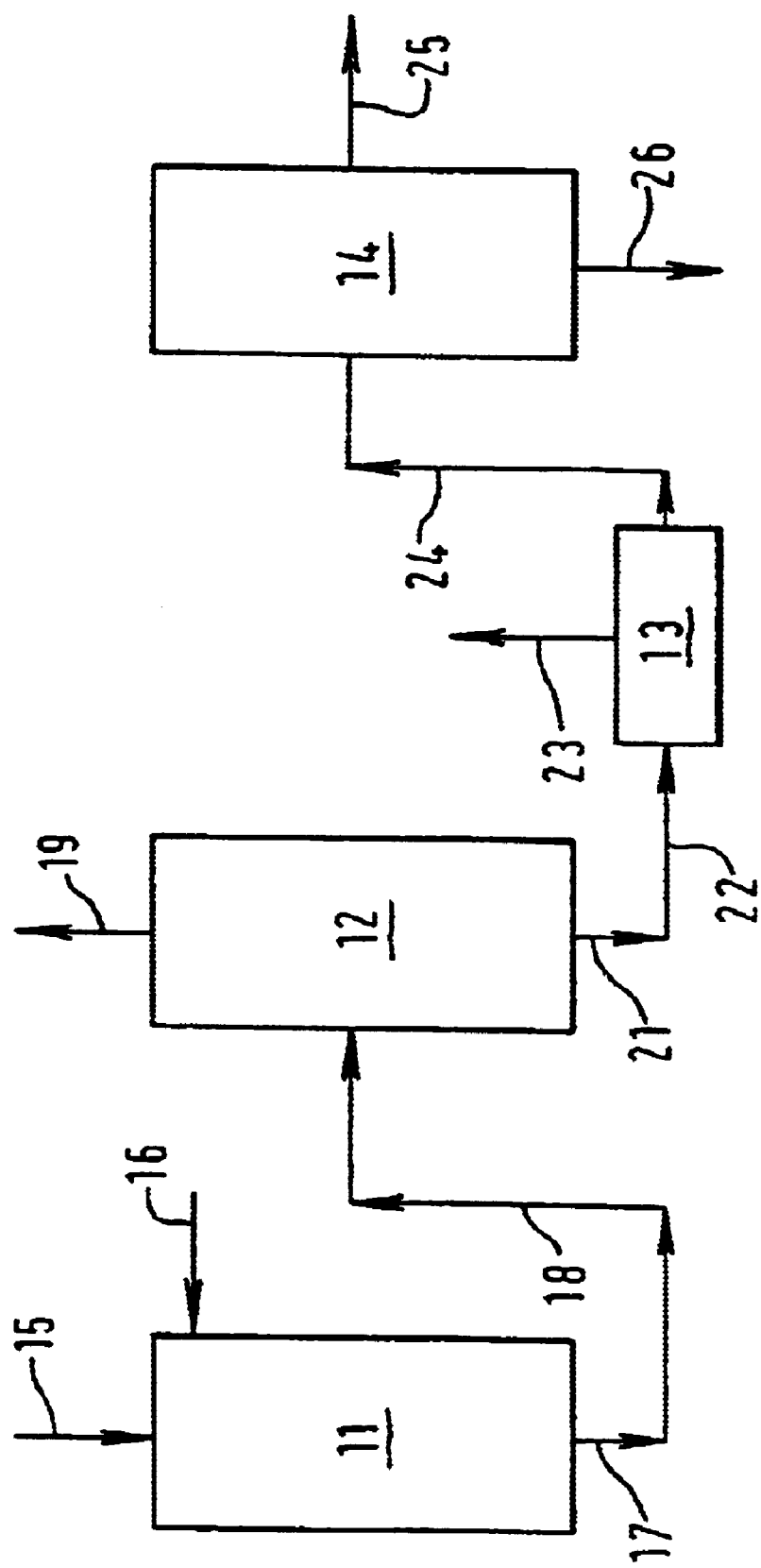
FIG. 1 is a flow diagram of a process in accordance with the invention.

FIG. 1 shows a process for removing water from a gas stream, in accordance with the invention. The process comprises a turbulent contractor stage 11, a gas liquid separator 12, a depressurizer 13 and a glycol regeneration stage 14. Water-bearing natural gas is fed to the contactor at 15 and a triethylene glycol (TEG) absorbent at 16. In the contactor 11, the TEG absorbs the water from the natural gas and a homogeneous gas/liquid mixture leaves the contactor at 17.

The mixture is conveyed via line 18 to the separator 12 where the gas and liquid phases are separated. A water-free gas phase leaves the separator 12 at 19 and a liquid phase, comprising TEG and absorbed water is removed at 21.

This liquid phase is conveyed via a line 22 to a depressurizer 13 where water vapour is flashed off and removed via a water vapour outlet 23. The TEG with the remaining water is conveyed via a line 24 to the glycol regeneration stage 14, from which glycol is removed via a glycol outlet 25 and water is removed via a water outlet 26. The regenerated glycol can be recycled to the glycol inlet 16 to the contactor stage 11.

Figure 2:
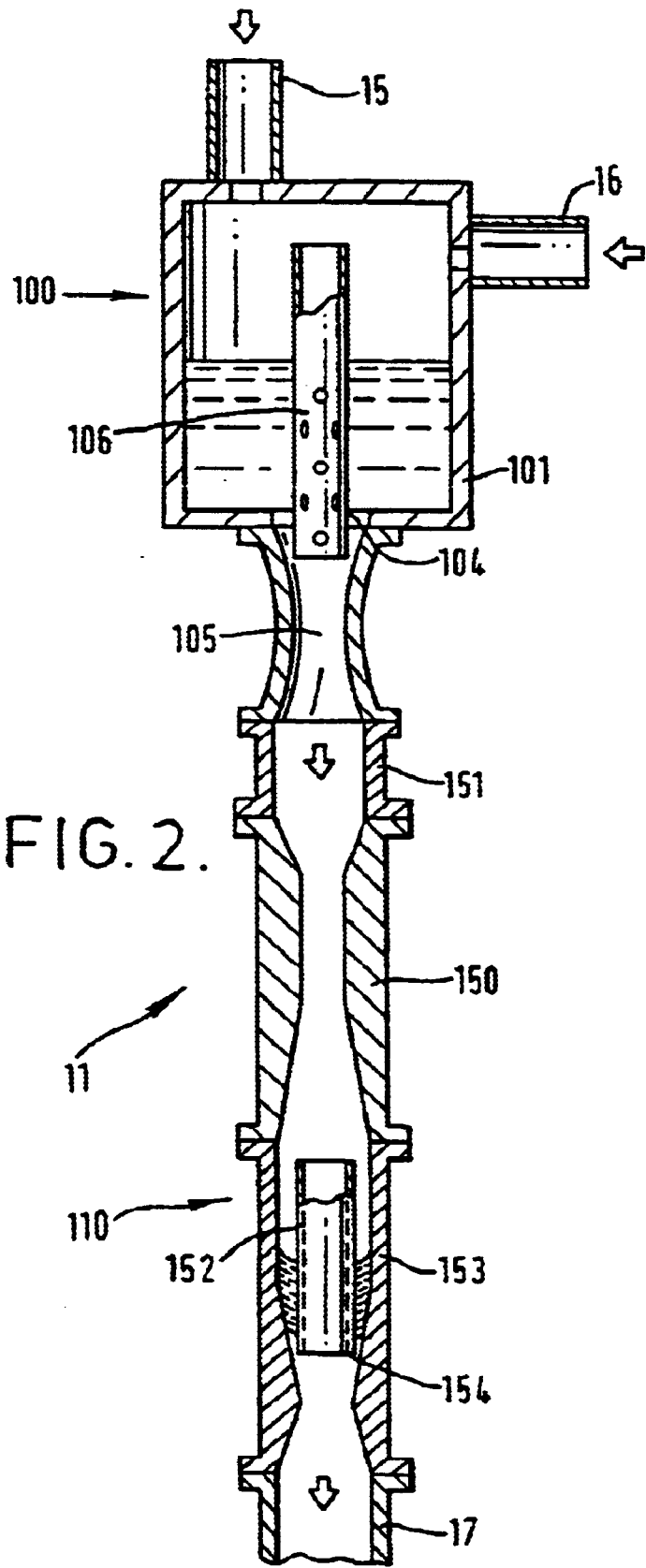
FIG. 2 is a view of the contacting section of the apparatus.

The contactor stage 11 is shown in more detail in FIG. 2. This stage 11 comprises two stages. The turbulent contactor 100 forming the first stage comprises a vessel 101 having the natural gas inlet 15, the glycol inlet 16 and an outlet 104 leading to a venturi passage 105. There is a tube 106 (which may or may not be perforated) extending from the outlet 104 back into the vessel 101.

The glycol and the natural gas are supplied to the vessel 101, the glycol being supplied to a level above the level of the outlet 104, whereby the gas is forced out through the outlet 104 via the tube 106, thereby drawing the glycol into the venturi so that the two phases are mixed.

The homogeneous gas/liquid mixture from the first turbulent contactor 100 is conveyed to a second turbulent contactor 110. Thus, the mixture enters an annular flow generator 150 from a spool piece 151, or directly from the diffuser of the venturi 105. As the gas/liquid mixture flows through the expanding outlet part of the annular flow generator 150, a liquid film establishes at the wall to form an annular gas/liquid flow essentially with the gas in the pipe core and the liquid at the pipe wall. The liquid film will be maintained in the annulus between inner and outer pipes 152 and 153 respectively.

The conditions at the outlet 154 of the inner pipe 152 are similar to the conditions at the outlet 104 of the first turbulent contactor. It is clear that, in principle, any number of stages can be added to the system, although considerations such as pressure drop should be taken into account.

Figure 3:
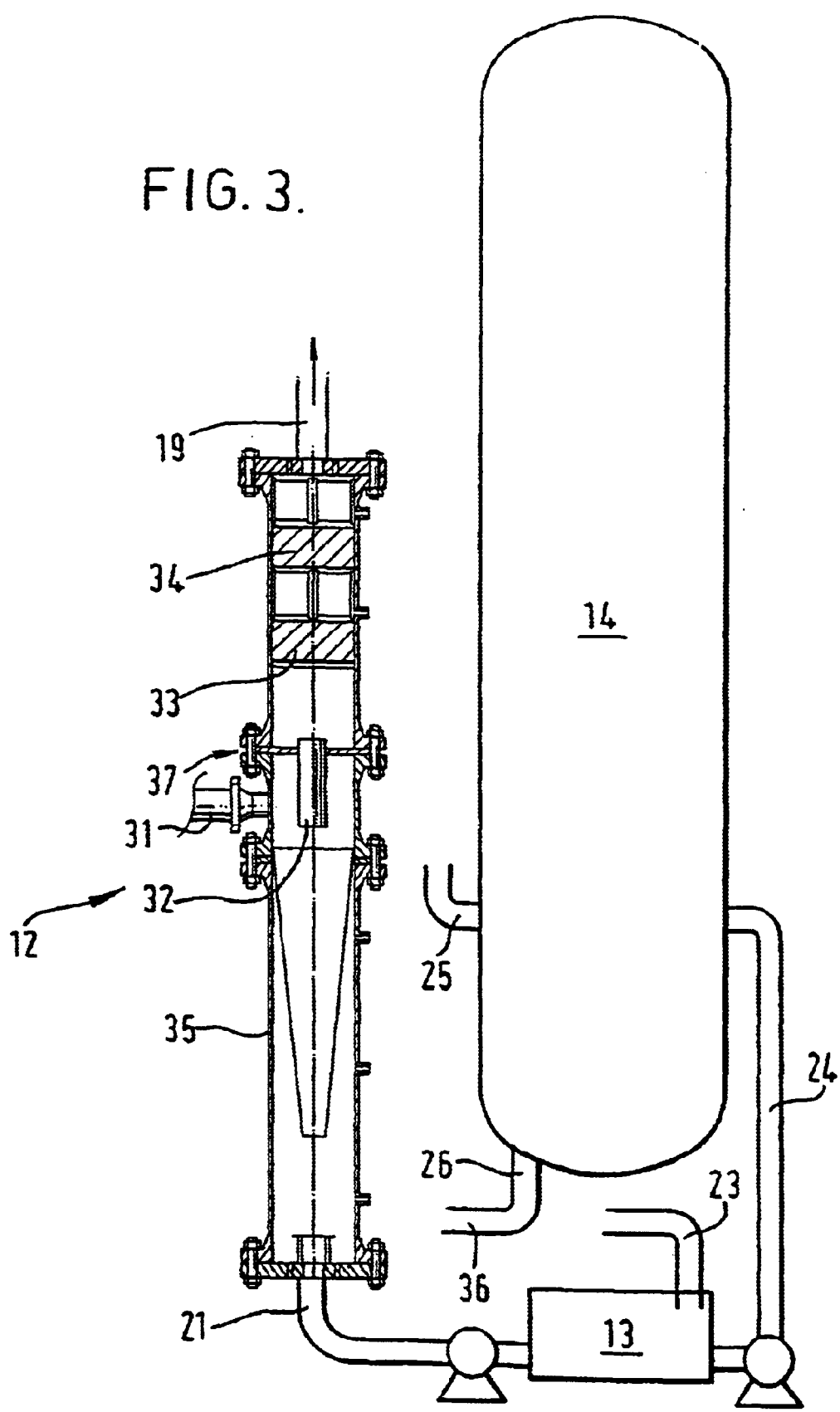
FIG. 3 is a view of the glycol separation and regeneration sections.

As shown in FIG. 2, the mixture leaving the second core 110 at the outlet 17 is conveyed to a hydrocyclone gas liquid separator 12 via a tangential inlet 31 (see FIG. 3). The two phases present are separated in the normal way. The gas phase, comprising dehydrated natural gas, passes upwards via a center tube 32 and two demistor stages 33,34, and leaves via the gas outlet 19. The liquid phase, comprising glycol and absorbed water, passes downwards via a conical collector 35 and leaves via the liquid outlet 21. Accumulated liquid can be drained from tubes at 37 at the level of the supporting for the centre tube 32.

The liquid is conveyed to a depressuriser 13, where some of the absorbed water is flashed off and leaves via the water vapour outlet 23. The glycol and any remaining absorbed water is pumped to the glycol regenerator 14 via the line 24. Here, the remaining absorbed water is separated from the glycol. The water is removed via the outlet 25 and dehydrated glycol is removed via the glycol outlet 26. This regenerated glycol is then recycled to the glycol inlet 16 to the contactor stage 11, via a recycle line 36.

What is claimed is:

1. A method of removing water from natural gas which comprises: bringing the natural gas into contact with a liquid including an absorbent for the water, subjecting the natural gas and liquid to turbulent mixing conditions thereby causing the water to be absorbed by the absorbent; and separating a natural gas phase with reduced water content and a liquid phase including the absorbent and absorbed water; and in which the mixing is conducted in a turbulent contactor including a gas inlet, a liquid inlet, an outlet leading to a venturi passage and a tube extending from the outlet back upstream, the tube being performed and/or being spaced from the periphery of the outlet.

2. A method as claimed in claim 1, in which the tube is located in a vessel, the vessel including the gas inlet, the liquid inlet and the outlet.

3. A method as claimed in claim 2, in which the natural gas is supplied to the tube and the liquid is supplied to the vessel, and so the natural gas stream draws the liquid into the venturi and the two phases are mixed.

4. A method as claimed in claim 2, in which the natural gas is supplied to the vessel and the liquid is supplied to the tube, whereby the natural gas is drawn into the venturi by the liquid and the two phases are mixed.

5. A method as claimed in claim 2, in which the liquid and the natural gas are supplied to the vessel, the liquid being supplied to a level above the level of the outlet, whereby the natural gas is forced out through the outlet via the tube, thereby drawing the liquid into the venturi so that the two phases are mixed.

6. A method as claimed in claim 1, in which the method is carried out as a continuous process with the natural gas and liquid flowing co-currently.

7. A method as claimed in claim 1, in which the natural gas and the liquid are formed into a homogeneous mixture in the contactor, the homogeneous mixture optionally being cooled prior to separation into a gas phase and a liquid phase.

8. A method as claimed in claim 7, in which the homogeneous mixture is separated into a gas phase and a liquid phase in a hydrocyclone.

9. A method as claimed in claim 1, in which the absorbent in the liquid phase is subjected to a regeneration treatment to remove the absorbed water.

10. A method as claimed in claim 9, in which the regenerated absorbent-containing liquid phase is recycled to the contactor.

11. A method as claimed in claim 10, in which the regeneration is carried out by heating and/or by flashing off the absorbed water.

12. A method as claimed in claim 11, in which a postmixing cooling and the regenerative heating are achieved, at least in part by mutual heat exchange.

13. A method as claimed in claim 1, in which the absorbent is miscible with water.

14. A method as claimed in claim 1, in which the absorbent is immiscible with water.

15. A method as claimed in claim 1, in which the absorbent includes a glycol.

16. A method as claimed in claim 15, in which the absorbent is selected from the group consisting of monoethylene glycol, diethylene glycol triethylene glycol or a mixture of any of these.

17. A method as claimed in claim 1, in which the natural gas and liquid are subjected to two or more mixing steps.

18. A method as claimed in claim 17, in which an additional mixing step is carried out before the turbulent mixing step.

19. A method as claimed in claim 17, in which an additional mixing step is carried out after the turbulent mixing step.

20. A method as claimed in claim 18, in which one or more additional mixing steps are turbulent mixing steps.

21. A method as claimed in claim 20, in which a second mixing step is carried out in a second contactor, located in a pipe extending from the venturi passage of the first contactor.

22. A method as claimed in claim 21, in which the fluid mixture is separated into a gas phase and a liquid phase between the two contactors, the phase separation occurring in an annular flow generator.

23. A method as claimed in claim 21, in which fresh liquid solvent is added to the second contactor.

24. Apparatus for removing water from natural gas by bringing the natural gas into contact with a liquid including an absorbent for the water, comprising: a turbulent contactor in which the natural gas and liquid are subjected to turbulent mixing conditions thereby causing the water to be absorbed by the absorbent; and a separator for separating a natural gas phase with reduced water content and a liquid phase including the absorbent and absorbed water, and in which the turbulent contactor comprises a gas inlet, a liquid inlet, an outlet leading to a venturi passage and a tube extending from the outlet back upstream, the tube being perforated and/or being spaced from the periphery of the outlet.

25. Apparatus as claimed in claim 24, in which the tube is located in a vessel, the vessel including the gas inlet, the liquid inlet and the outlet.

26. Apparatus as claimed in claim 24, in which the separator includes a hydrocyclone.

27. Apparatus as claimed in claim 24, in which the separator includes a absorbent regenerator.

28. Apparatus as claimed in claim 24, in which the contactor includes two ore more contactor steps.

29. Apparatus as claimed in claim 28, in which the second turbulent contactor is located in a pipe extending from the venturi section of the first contactor.

30. The method of using one or more turbulent contactors for absorbing water from a natural gas stream including contacting the gas stream with a liquid including an absorbent in at least one turbulent contactors wherein the at least one turbulent contactor comprises a gas inlet, a liquid inlet, an outlet leading to a venturi passage and a tube extending from the outlet back upstream.

31. A method of use as claimed in claim 30, in which a second turbulent contactor is located in a pipe extending from the venturi section of the first contactor.

32. A method of use as claimed in claim 30, in which a gas phase and a liquid phase are separated after exit from a first turbulent contactor before entry into a second turbulent contactor, the phase separation occurring in an annular flow generator.

* * * * *